(12) United States Patent
Van Kessel

(10) Patent No.: US 9,231,473 B2
(45) Date of Patent: Jan. 5, 2016

(54) INCREASING EAP CONVERSION EFFICIENCY BY CONTINUOUS CURRENT

(71) Applicant: Rick Van Kessel, Nice (FR)

(72) Inventor: Rick Van Kessel, Nice (FR)

(73) Assignee: SINGLE BUOY MOORINGS INC., Marly (CH)

( * ) Notice: Subject to any disclaimer, the term of this patent is extended or adjusted under 35 U.S.C. 154(b) by 0 days.

(21) Appl. No.: 14/399,969

(22) PCT Filed: May 8, 2013

(86) PCT No.: PCT/EP2013/059614
§ 371 (c)(1),
(2) Date: Nov. 10, 2014

(87) PCT Pub. No.: WO2013/167667
PCT Pub. Date: Nov. 14, 2013

(65) Prior Publication Data
US 2015/0097536 A1   Apr. 9, 2015

(30) Foreign Application Priority Data

May 10, 2012   (EP) ...................................... 12167572

(51) Int. Cl.
*H02M 3/158* (2006.01)
*H02N 2/18* (2006.01)
*F03B 13/14* (2006.01)

(52) U.S. Cl.
CPC ............... *H02M 3/158* (2013.01); *F03B 13/14* (2013.01); *H02N 2/18* (2013.01); *H02N 2/181* (2013.01); *F05B 2280/50* (2013.01); *Y02E 10/38* (2013.01)

(58) Field of Classification Search
CPC ... H02M 3/156; H02M 3/158; H02M 3/1582; H02M 3/1584; H02M 3/18

USPC .................. 323/271, 272, 282, 288; 320/166
See application file for complete search history.

(56) References Cited

U.S. PATENT DOCUMENTS 6,175,217 B1 * 1/2001 Da Ponte et al. ............... 322/19
6,936,994 B1 * 8/2005 Gimlan ......................... 320/101

(Continued)

FOREIGN PATENT DOCUMENTS

DE       44 35 832 A1    4/1996
JP       2008-141840 A   6/2008
WO       2010/146457 A2  12/2010

OTHER PUBLICATIONS

International Search Report, dated May 9, 2014, from corresponding PCT application.

*Primary Examiner* — Jessica Han
(74) *Attorney, Agent, or Firm* — Young & Thompson

(57) ABSTRACT

An electromechanical energy conversion system includes a variable capacitor, an electronic charging/discharging unit and a power source/sink; the power source/sink being coupled to the electronic charging/discharging unit which is coupled to the variable capacitor; the variable capacitor including first and second electrodes that are separated by an intermediate medium providing a gap distance therebetween; the gap distance being adjustable between a minimal distance and a maximal distance as a function of an externally applied mechanical force; the electronic charging/discharging unit being arranged for charging the variable capacitor from the power source/sink at substantially a state of the variable capacitor when the gap distance is minimal and the area of the elastically deformed body maximal, and for discharging the variable capacitor to the power source/sink at substantially a state of the variable capacitor when the gap distance is maximal and the area of the elastically deformed body minimal.

11 Claims, 5 Drawing Sheets

(56) References Cited

U.S. PATENT DOCUMENTS

| | | |
|---|---|---|
| 2001/0035723 A1 | 11/2001 | Pelrine et al. |
| 2007/0257490 A1 | 11/2007 | Kornbluh et al. |
| 2010/0045248 A1* | 2/2010 | Hawley ............... 323/282 |
| 2010/0314945 A1* | 12/2010 | Yamazaki et al. ....... 307/80 |
| 2013/0271077 A1* | 10/2013 | Kim et al. ............. 320/109 |

* cited by examiner

INCREASING EAP CONVERSION EFFICIENCY BY CONTINUOUS CURRENT

FIELD OF THE INVENTION

The present invention relates to an electromechanical energy conversion system. Also, the present invention relates to a method of electromechanical energy conversion.

BACKGROUND ART

Electro Active Polymers (EAP) in electromechanical energy conversion applications require active excitation in each electrical or mechanical cycle. Generally, the material is charged at the beginning of the cycle, and discharged at the end of the cycle. It is this charge biasing that allows the electromechanical conversion process.

For typical applications having cycles with relatively small deformations (<50%), the energy required to bias the material is much larger than the net amount of energy that is converted. Given the high series resistance of present EAP devices, the energy lost in the charging and discharging phase easily exceeds the converted energy. Therefore, high conversion efficiencies can only be achieved by a highly efficient charging and discharging process.

An electromechanical energy conversion system using an EAP based device is for example disclosed in WO 2010/146457. Such an EAP based device can be considered as a variable capacitor of which the capacitance changes as a function of the amount of deformation exerted on a layer of EAP material.

In the already known EAP charging and discharging systems, a switching DC/DC or AC/DC Power Electronic Converter (PEC) performs the charging and discharging of a variable capacitor from/to a power source/sink. Typically, charging is performed by a step-up converter, such as a boost converter, while the discharging is accomplished by a step-down converter, such as a buck converter.

FIG. 1 shows schematically a part of a circuit of a prior art electromechanical energy conversion system with parallel a boost converter and a buck converter between a power source/sink and an EAP based device.

The circuit 1 of the electromechanical conversion system comprises a low-voltage (Ub<Uvc) power source LV and a variable capacitor 10 based on an elastically deformable body of an EAP material. The power source is arranged to act as power source during charging of the variable capacitor and as power sink during discharge of the variable capacitor.

The power source LV and the variable capacitor 10 are coupled to each other by a parallel arrangement of an step-up converter (boost converter) L1, S1, D1 and an step-down converter (buck converter) L2, S2, D2.

The step-up converter L1, S1, D1 comprises a boost inductor L1, a boost switching element S1 and a boost diode D1, wherein the boost inductor L1 and the boost diode D1 are arranged in series between the positive terminal of the power source LV and the positive electrode (plate) of the variable capacitor 10. The forward direction of the boost diode D1 is in the direction towards the positive terminal of the variable capacitor 10.

The negative terminal of the power source LV and the negative electrode of the variable capacitor 10 are directly coupled by a line 11. The boost switching element S1, typically a transistor, is arranged with one terminal of the switch connected between the boost inductor L1 and the boost diode d1 and the other terminal of the switch connected to the line 11.

The step-down converter L2, S2, D2 comprises a buck inductor L2, a buck switching element S2 and a buck diode D2, wherein the buck inductor L2 and the buck switching element S2 (typically a transistor) are arranged in series between the positive terminal of the power source LV and the positive electrode (plate) of the variable capacitor 10. The negative terminal of the power source LV and the negative electrode of the variable capacitor 10 are directly coupled by a second line 12. The buck diode D2 is arranged with one terminal connected between the buck switch S2 and the buck inductor L2 and the other terminal of the diode D2 connected to the second line 12.

Note that the highly resistive EAP device (the variable capacitor 10) is on the load side during charging and on the source side during discharging.

Inherent to this arrangement of the switching DC/DC step-up and step-down converters L1, S1, D1; L2, S2, D2 is that during operation either the load side current (step-up) or the source side current (step-down) is being interrupted by a high-frequency on/off switching by means of the switching element S1; S2. The resulting discontinuous current increases the losses in the series components significantly, because of a higher effective current value. As known to the skilled in the art, the power being converted in such switching DC/DC step-up and step-down converters is related to the average current, while the effective current is relevant for the losses.

It is an object of the present invention to provide an electromechanical energy conversion system and a method for such a system that overcomes the disadvantage from the prior art.

SUMMARY OF THE INVENTION

To achieve the object, the present invention provides an electromechanical energy conversion system as disclosed below.

The object is achieved by locating the highly resistive EAP based device in the circuit portion of the step-down converter on the load side during charging and in the circuit portion of the step-up converter on the source side during discharging.

Advantageously, the highly resistive EAP based device is thus in the circuit portion of the step-up or step-down respective converter where the current is in continuous mode while low-resistive DC-bus (of the power source) is on the side of the respective converter where the current is in discontinuous mode. As a result the present invention provides that the ratio between the effective current and the average current is significantly reduced, leading to less losses and higher efficiency of the energy conversion.

According to an aspect of the invention, there is provided an electromechanical energy conversion system as described above, wherein the step-down converter is a buck converter and the step-down converter is a boost converter.

According to an aspect of the invention, there is provided an electromechanical energy conversion system as described above, wherein the electronic charging/discharging unit is arranged for charging/discharging in continuous current mode.

According to an aspect of the invention, there is provided an electromechanical energy conversion system as described above, wherein the variable capacitor comprises a deformable layer of Electro Active Polymer of a stretchable synthetic material wherein the first and second electrodes are formed as inner and outer electrode layers respectively, on the respective inner and outer surface of the deformable layer.

According to an aspect of the invention, there is provided an electromechanical energy conversion system as described above, wherein the deformable layer is a wall of a elastically deformable body; the elastically deformable body being adapted for floating in water.

According to an aspect of the invention, there is provided an electromechanical energy conversion system as described above wherein the externally applied mechanical force is generated by waves in the water.

According to an aspect of the invention, there is provided a method for electromechanical energy conversion in an electromechanical energy conversion system comprising a variable capacitor, an electronic charging/discharging unit and a power source; the power source being coupled to the electronic charging/discharging unit; the electronic charging/discharging unit being coupled to the variable capacitor; the variable capacitor comprising first and second electrodes that are separated by an intermediate medium providing a gap distance between the first and second electrodes; the gap distance of the variable capacitor being adjustable between a minimal distance and a maximal distance as a function of an externally applied mechanical force; the method comprising
  electronically charging the variable capacitor from the power source at substantially a state of the variable capacitor when the gap distance is substantially minimal and the area of the elastically deformable body substantially maximal, and
  electronically discharging the variable capacitor to the power source at substantially a state of the variable capacitor when the gap distance is substantially maximal and the area of the elastically deformable body substantially minimal,
and wherein
the electronically charging of the variable capacitor is performed by a step-down converter, and
the electronically discharging of the variable capacitor is performed by a step-up converter, under the condition that the power source is a DC source with a voltage (UB) larger than a voltage (Uvc) between the first and second electrodes;
the step-down converter and the step-up converter being arranged in parallel between the power source and the variable capacitor electrodes.

BRIEF DESCRIPTION OF DRAWING

The invention will be explained in more detail below with reference to drawings in which illustrative embodiments thereof are shown. The drawings are intended exclusively for illustrative purposes and not to restrict the inventive concept, which is defined by the claims.

In the following figures, the same reference numerals refer to similar or identical components in each of the figures.

DETAILED DESCRIPTION OF EMBODIMENTS

The present invention proposes to significantly reduce the losses in the series resistances, both in the EAP based device and in other high-voltage components. The key in this invention is to optimize the conversion process at the place where the electrical conditions are poor, at the cost of a degraded conversion process at the place where the electrical conditions are (already) significantly better.

Figure 2:
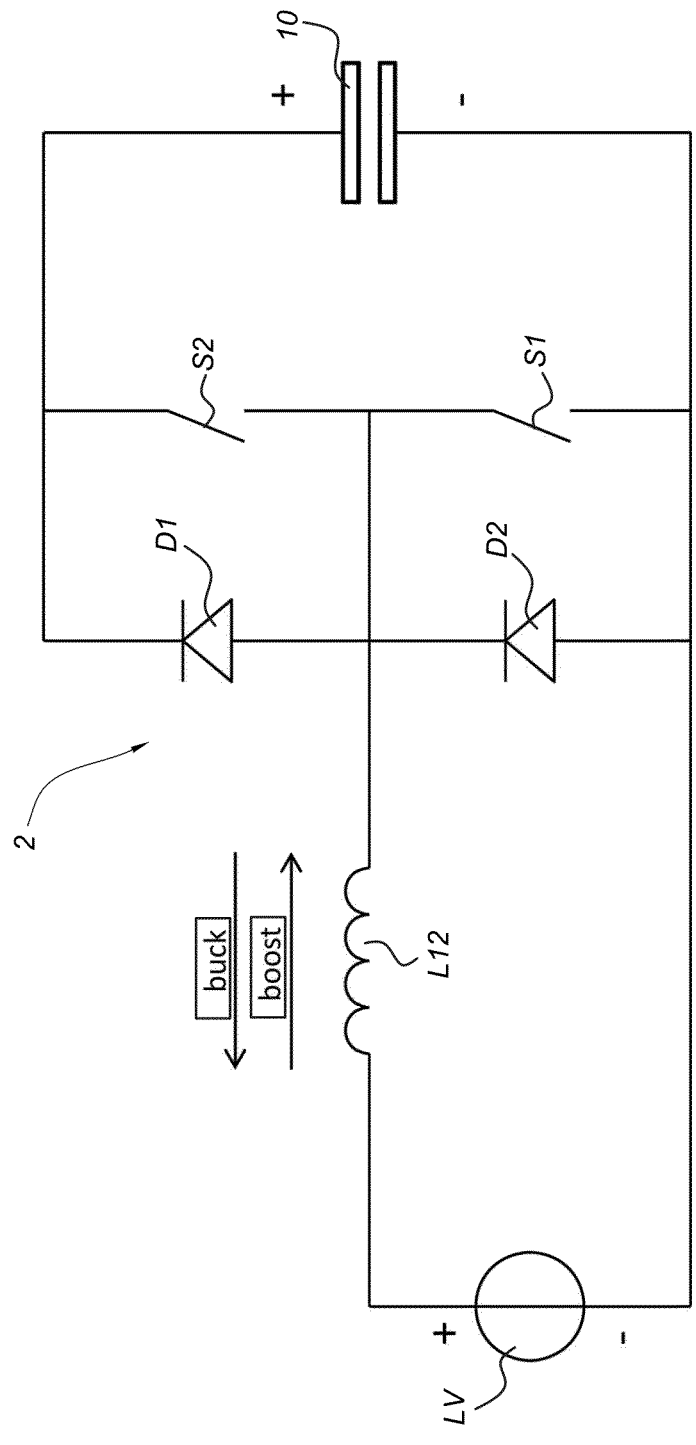
FIG. 2 shows schematically a part of a circuit of a prior art electromechanical energy conversion system with a combined boost/buck converter between power source and EAP based device.

FIG. 2 shows schematically a part of a circuit of a prior art electromechanical energy conversion system 2 with a combined boost/buck converter between power source and EAP based device.

In this arrangement of the step-up converter and the step-down converter, the inductors of the step-up converter and the step-down converter are combined in a single inductor L12. Further, buck switching element S2 is now parallel with the boost diode D1, and the boost switching element S1 is now in parallel with the buck diode D2. The forward direction of the boost diode D1 is towards the positive terminal of the variable capacitor 10.

Both the boost switching element S1 and the buck diode D2 are connected each with one terminal to a connection node N between inductor 12 and the boost diode D1 and with the respective other terminal to the line 11 that connects the negative terminal of the power source LV and the negative electrode of the variable capacitor 10.

Figure 1:
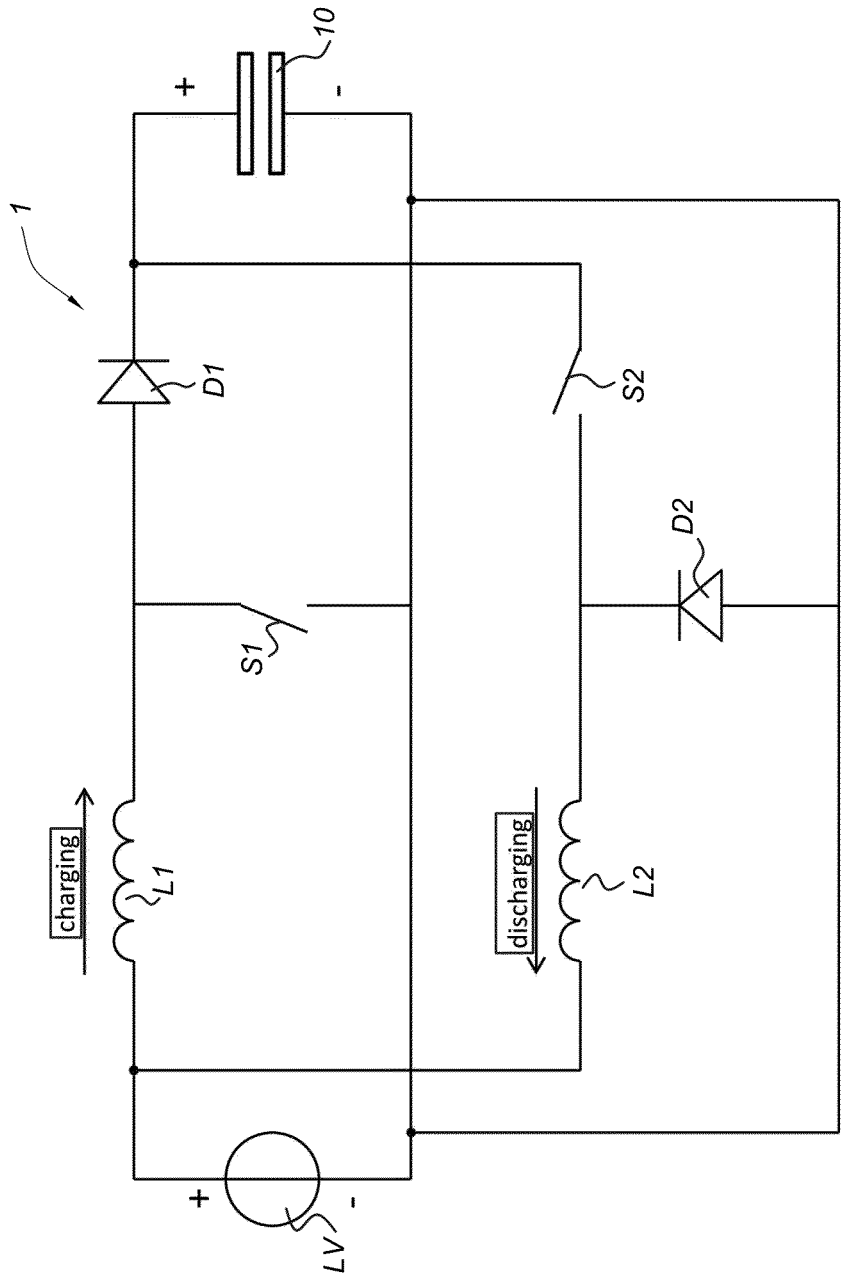
FIG. 1 shows schematically a part of a circuit of a prior art electromechanical energy conversion system with parallel boost converter and buck converter between power source and EAP based device.

As in FIG. 1, the highly resistive EAP device (the variable capacitor 10) is on the load side during charging and on the source side during discharging while the power source LV is positioned on the source side of the circuit during charging and on the load side during discharging, yielding relative high losses during operation in a similar way as the circuit shown in FIG. 1.

Figure 3:
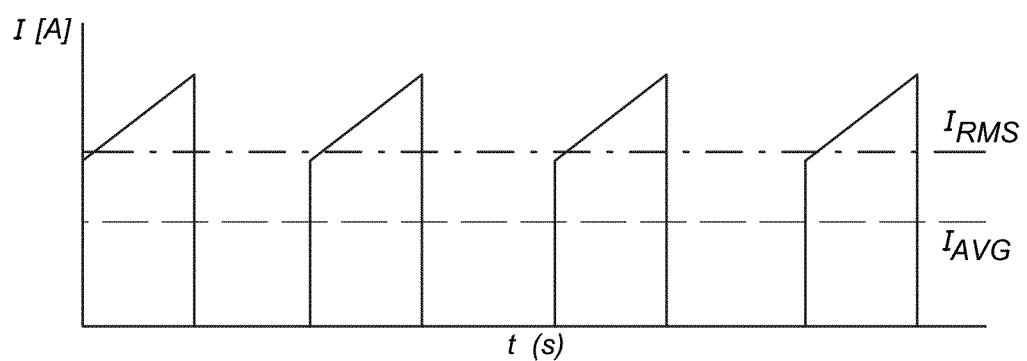
FIG. 3 shows schematically an example of an average current and effective current for a typical converter discontinuous current waveform as obtained in a prior art electromechanical energy conversion system.

FIG. 3 shows schematically an example of an average current and effective current for a typical converter discontinuous current waveform as obtained in a prior art electromechanical energy conversion system.

The circuit of FIG. 1 or FIG. 2 produces a typical discontinuous current waveform at the side of the EAP based device, emphasizing the difference between the average current $I_{AVG}$ and the effective current Irms. For this particular waveform, the effective current $I_{RMS}$ is 60% higher than the average current $I_{AVG}$, resulting in 156% more losses compared to a DC waveform.

Figure 4:
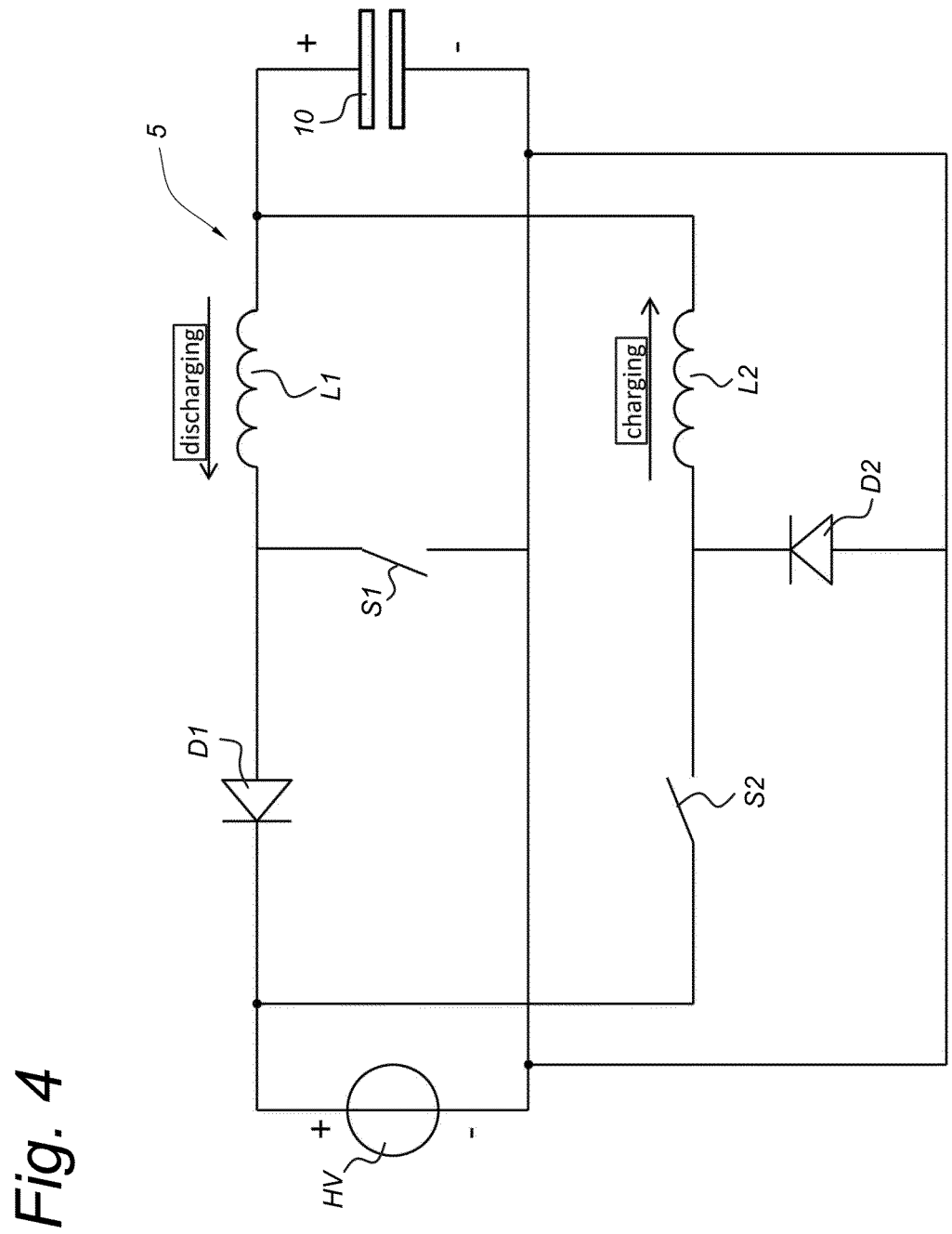
FIG. 4 shows schematically a part of a circuit of an electromechanical energy conversion system with parallel boost converter and buck converter between power source and EAP based device according to an embodiment of the invention.

FIG. 4 shows schematically a part of a circuit of an electromechanical energy conversion system with parallel boost converter and buck converter between power source and EAP based device according to an embodiment of the invention.

The circuit 5 of the electromechanical conversion system comprises a high-voltage (Ub>Uvc) power source HV and a variable capacitor 10 based on an elastically deformable body of an EAP material.

The power source HV and the variable capacitor 10 are coupled to each other by a parallel arrangement of a step-up converter (boost converter) L1, S1, D1 and an step-down converter (buck converter) L2, S2, D2.

The step-up converter L1, S1, D1 comprises a boost inductor L1, a boost switching element S1 and a boost diode D1, wherein the boost inductor L1 and the boost diode D1 are arranged in series between the positive terminal of the power source HV and the positive electrode (plate) of the variable capacitor 10.

The boost inductor L1 is connected at one terminal to the positive electrode of the variable capacitor 10 and at the other terminal to the anode (−) of the boost diode D1. The cathode (+) of the boost diode D1 is connected to the positive terminal of the power source HV. Note that the forward direction of the boost converter is thus directed from the variable capacitor 10 to the power source HV.

The negative terminal of the power source HV and the negative electrode of the variable capacitor 10 are directly coupled by a line 11.

The boost switching element S1 is arranged with one terminal of the switch connected between the boost inductor L1 and the boost diode D1 and the other terminal of the switch connected to the line 11.

The step-down converter L2, S2, D2 comprises a buck inductor L2, a buck switching element S2 and a buck diode D2, wherein the buck inductor L2 and the buck switching element S2 (typically a transistor) are arranged in series between the positive terminal of the power source HV and the positive electrode (plate) of the variable capacitor 10. The buck switching element S2 is connected with one terminal to the positive terminal of the power source HV and with the other terminal of the switch to one terminal of the buck inductor L2. The other terminal of the buck inductor L2 is connected to the positive electrode of the variable capacitor 10.

The negative terminal of the power source HV and the negative electrode of the variable capacitor 10 are directly coupled by a second line 12. The buck diode D2 is arranged with one terminal connected between the buck switch S2 and the buck inductor L2 and the other terminal of the diode D2 connected to the second line 12.

Note that in this circuit the highly resistive EAP device (the variable capacitor 10) is on the load side during charging and on the source side during discharging. As a result the current from the variable capacitor during the discharging operation is now uninterrupted by the switching element(s), given that the converter is operated in Continuous Conduction Mode (CCM).

Additionally it is noted that due to the arrangement of the step-up converter the requirement is fulfilled that the voltage UB of the power source HV is higher than the voltage Uvc over the electrodes of the variable capacitor 10.

In the circuit of FIG. 4, the charging of the variable capacitor is now performed by the step-down converter and the discharging of the variable capacitor is performed by the step-up converter. Furthermore, in the circuit of FIG. 4, the power source is arranged as a DC source with a voltage (UB) larger than the voltage (Uvc) between the first and second electrodes of the variable capacitor 10.

Figure 5:
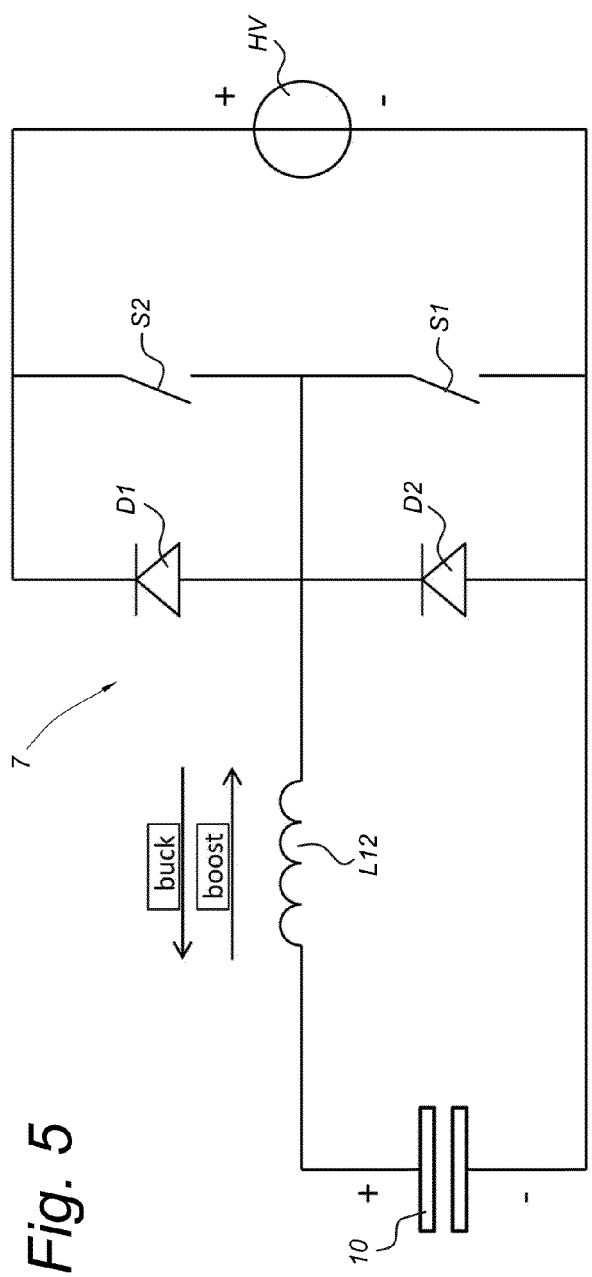
FIG. 5 shows schematically a part of a circuit of an electromechanical energy conversion system with a combined boost/buck converter between power source and EAP based device according to an embodiment of the invention.

FIG. 5 shows schematically a part of a circuit of an electromechanical energy conversion system with a combined boost/buck converter between power source and EAP based device according to an embodiment of the invention.

The circuit of FIG. 5 is similar to that shown in FIG. 2, except the power source HV is now positioned with its positive terminal coupled to the cathode of the boost diode D1 and the buck switching element S2, while the variable capacitor 10 is now positioned on the side of the inductor L12. Note that the forward direction of the boost and buck diodes D1, D2 is now towards the positive terminal of the power source HV in contrast to the circuit of FIG. 2 where the forward direction of the boost and buck diodes was towards the positive electrode of the variable capacitor 10.

In the circuit of FIG. 5, the charging of the variable capacitor is now performed by the step-down converter and the discharging of the variable capacitor is performed by the step-up converter. As a result of the charging and discharging by the step-down converter and the step-up converter respectively, in the circuit of FIG. 5, the power source is arranged as a DC source with a voltage (UB) larger than the voltage (Uvc) between the first and second electrodes of the variable capacitor 10.

Figure 6:
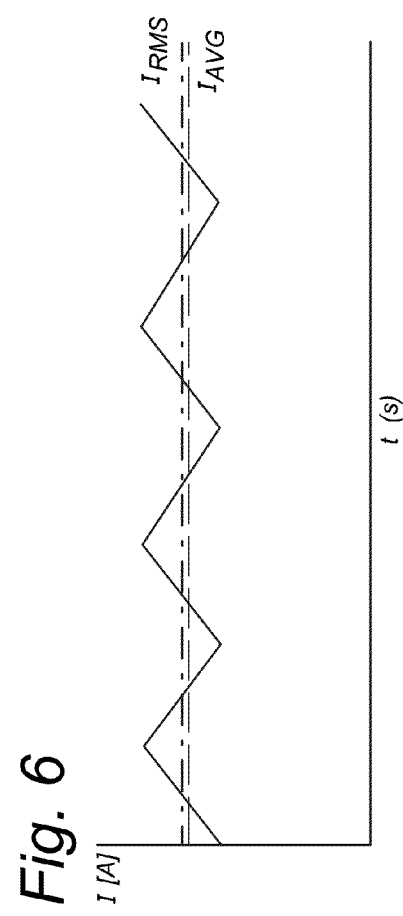
FIG. 6 shows schematically an example of an average current and effective current for a typical converter continuous current waveform as obtained in an electromechanical energy conversion system according to an embodiment of the invention.

FIG. 6 shows schematically an example of an average current and effective current for a typical converter continuous current waveform as obtained in an electromechanical energy conversion system according to an embodiment of the invention.

For that purpose, the EAP based device with high series resistance is positioned in such a way that only continuous switching currents are applied during charging and discharging, which significantly reduces the ratio between the effective and average current. Consequently, the losses in the series resistance are reduced considerably, where a loss reduction of 50% is to be expected when the $I_{RMS}/I_{AVG}$ ratio is reduced by 30%. The losses in the series resistance of the power source DC bus, from which the EAP based device is charged and discharged, are increased with the same ratio, but since the series resistance of the power source DC bus is typically orders of magnitude lower than the EAP device series resistance, the increase of effective current can easily be accumulated in this part.

The present invention also provides a method for electromechanical energy conversion in an electromechanical energy conversion system as described above, wherein the method comprises electronically charging the variable capacitor 10 from the power source HV at substantially a state of the variable capacitor 10 when the gap distance is substantially minimal and the area of the elastically body substantially maximal, and electronically discharging the variable capacitor 10 to the power source HV at substantially a state of the variable capacitor when the gap distance is substantially maximal and the area of the elastically body substantially minimal, and wherein the electronically charging of the variable capacitor is performed by a step-down converter L2, S2, D2; L12, S2, D2, and the electronically discharging of the variable capacitor is performed by a step-up converter L1, S1, D1; L12, S1, D1, under the condition that the power source is a DC source with a voltage (UB) larger than a voltage (Uvc) between the electrodes of the variable capacitor 10;

the step-down converter and the step-up converter being arranged in parallel between the power source and the variable capacitor electrodes.

It is noted that the invention is not limited to buck/boost converter configurations such as shown in FIGS. 4 and 5. According to the invention, the circuits shown in FIGS. 4 and 5 can be replaced by other buck/boost converter topologies, such as multi-level and interleaved buck/boost-converters wherein the charging of the variable capacitor is performed by the step-down converter charging the variable capacitor by the step-down converter and the discharging of the variable capacitor is performed by the step-up converter.

The present invention provides various advantages and benefits over prior art systems.

Significant reduction of losses in the high series resistance of the EAP material, and therefore a higher efficiency in the EAP electromechanical conversion process.

Size and cost reduction of the main power components, including but not limited to cabling, cooling systems and electrode material.

Reduced high frequency content in the current waveform, which is likely to reduce fatigue phenomena in the material.

Parasitic inductance in the EAP device can be used effectively as the primary inductor, whereas the parasitic capacitance of the bus can be used effectively to buffer the voltage.

The EAP based variable capacitor 10 is typically a elastically deformable body that comprises an arrangement of EAP stretchable synthetic material and electrode layers being arranged as a variable capacitor. The capacitance of the capacitor structure varies as the deformable body stretches and relaxes.

The elastically deformable body may be disposed in (a layer of) surface water, for example the sea surface, where waves carrying energy occur. The elastically deformable body is arranged to deform due to exposure to these waves. Such deformation is typically cyclical, comprises both stretching to a stretched state and a relaxation to a substantially undeformed or less deformed state by the interaction with the waves. The elastically deformable body may be an elongated tube consisting of a layer of a stretchable synthetic material disposed as a dielectric material between inner electrode layers and outer electrode layers. The distance between the inner and outer electrode layers is determined by the thickness of the layer of the stretchable synthetic material. Due to the tube shape a water wave may enter the tube and propagate through the tube while at the same time producing a bulge that deforms the tube wall. As a result, the thickness of the layer of a stretchable synthetic material may vary and change the distance between the inner and outer electrode layers, allowing the inner and outer electrode layers to function as a variable capacitor.

The electromechanical energy conversion system of the present invention may be part of an energy harvesting system for harvesting energy from the change of capacitance of an elastically deformable body acting as variable capacitor that occurs during the deformation cycle of the elastically deformable body.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims.

The invention claimed is:

1. Electromechanical energy conversion system comprising:
   a variable capacitor, an electronic charging/discharging unit and a power source/sink;
   the power source/sink being coupled to the electronic charging/discharging unit;
   the electronic charging/discharging unit being coupled to the variable capacitor;
   the variable capacitor comprising first and second electrodes that are separated by an intermediate medium providing a gap distance between the first and second electrodes;
   the gap distance of the variable capacitor being adjustable between a minimal distance and a maximal distance as a function of an externally applied mechanical force;
   the electronic charging/discharging unit being arranged for charging the variable capacitor from the power source/sink at substantially a state of the variable capacitor when the gap distance is minimal and/or the area of the elastically deformed body maximal, and for discharging the variable capacitor to the power source/sink at substantially a state of the variable capacitor when the gap distance is maximal and/or the area of the elastically deformed body minimal,
   wherein the electronic charging/discharging unit comprises a step-down converter and a step-up converter, the step-down converter and the step-up converter being arranged in parallel between the power source/sink and the variable capacitor electrodes, and
   wherein the electronic charging/discharging unit is arranged for charging the variable capacitor by the step-down converter and for discharging the variable capacitor by the step-up converter, under the condition that the power source/sink is a DC source with a voltage (UB) larger than the voltage (Uvc) between the first and second electrodes, and
   wherein the variable capacitor is on a load side during charging and on a source side during discharging.

2. Electromechanical energy conversion system according to claim 1, wherein the step-down converter is a buck converter and the step-down converter is a boost converter.

3. Electromechanical energy conversion system according to claim 1, wherein the electronic charging/discharging unit is arranged for charging/discharging in continuous current mode.

4. Electromechanical energy conversion system according to claim 1, wherein the variable capacitor comprises a deformable layer of Electro Active Polymer of a stretchable synthetic material wherein the first and second electrodes are formed as inner and outer electrode layers respectively, on the respective inner and outer surface of the deformable layer.

5. Electromechanical energy conversion system according to claim 4, wherein the deformable layer is a wall of a elastically deformable body; the elastically deformable body being adapted for floating in water.

6. Electromechanical energy conversion system according to claim 5, wherein the externally applied mechanical force is generated by waves in the water.

7. Method for electromechanical energy conversion in an electromechanical energy conversion system comprising a variable capacitor, an electronic charging/discharging unit and a power source/sink; the power source/sink being coupled to the electronic charging/discharging unit; the electronic charging/discharging unit being coupled to the variable capacitor; the variable capacitor comprising first and second electrodes that are separated by an intermediate medium providing a gap distance between the first and second electrodes; the gap distance of the variable capacitor being adjustable between a minimal distance and a maximal distance as a function of an externally applied mechanical force; the method comprising:
   electronically charging the variable capacitor from the power source at substantially a state of the variable capacitor when the gap distance is minimal and/or the area of the elastically deformed body maximal, and
   electronically discharging the variable capacitor to the power source at substantially a state of the variable capacitor when the gap distance is maximal and/or the area of the elastically deformed body minimal, and wherein the electronically charging of the variable capacitor is performed by a step-down converter, and the electronically discharging of the variable capacitor is performed by a step-up converter, under the condition that the power source/sink is a DC source with a voltage (UB) larger than a voltage (Uvc) between the first and second electrodes, wherein the variable capacitor is on a load side during charging and on a source side during discharging.

8. Method according to claim 7, wherein the step-down converter is a buck converter and the step-down converter is a boost converter.

9. Method according to claim 7, wherein the electronically charging and discharging are performed in continuous current mode.

10. Method according to claim 7, wherein the step-down converter and the step-up converter being arranged in parallel between the power source and the variable capacitor electrodes.

11. Method according to claim 7, wherein the step-down converter and the step-up converter being arranged as a combined buck/boost converter between the power source and the variable capacitor electrodes.

* * * * *